United States Patent Office 3,325,561
Patented June 13, 1967

3,325,561
GRAFT COPOLYMER OF POLYAMIDE ONTO A VINYL AROMATIC-UNSATURATED CARBOXYLIC ACID COPOLYMERIC BACKBONE
Gerald J. Grillo, Fitchburg, Rene Aelion, Groton, and Willard M. Sims, Leominster, Mass., assignors to Foster Grant Co., Inc., Leominster, Mass., a corporation of Delaware
No Drawing. Filed Oct. 22, 1964, Ser. No. 405,824
12 Claims. (Cl. 260—857)

The present invention deals with a new type of graft polymer formed from a linear polyamide-forming lactam having at least 6 carbon atoms and a vinyl compound-unsaturated carboxylic acid copolymer and characterized by its gel-free nature and ability to readily form fibers. More particularly, it relates to such polymers containing a high ratio of vinyl compound to unsaturated acid and a novel process of producing the graft polymers.

Various attempts have been made to improve lactam polymers. Investigators have attempted to form graft lactam polymers and the like, but the resultant polymers were of little commercial interest, largely due to their gelled or cross-linked structure.

It has been found that unique, tough thermoplastic graft polymers of lactams and vinyl aromatic-unsaturated carboxylic acid copolymers which are substantially free of cross-linking and gelling can now be prepared by the application of specific proportions of monomers.

The substantially gel-free, crosslink-free nature of these polymers is evidenced by their solubility in phenol-type solvents such as m-cresol, and ability to be formed into highly oriented fibers, the latter further illustrating a substantially true graft polymer rather than blends to have been formed. These new polymers further have high knot tensile strength, generally being at least 40% of the tensile strength of the unknotted control fiber. Knot strengths can be determined conveniently as by tying a knot in the middle of a 9-inch length of stretched filament, determining its tensile strength and comparing it with the same type of monofilament without a knot.

Molded parts of the present graft polymer show improvements in stiffness (ASTM test D-638) over the corresponding polylactam, as well as better resistance to water absorption. The latter is of particular commercial significance since water is known to cause undesirably large amounts of expansion in polylactam parts as well as decreasing their strength. When immersed for 24 hours in boiling 55% potassium acetate aqueous solution, the presently preferred polymers show at least 25% less water absorption than the corresponding polylactam.

The polymers of the present invention are characterized by the molar ratios of the monovinyl aromatic monomer compound (mole ratios of styrene or other monovinyl aromatic monomer) being 0.15 to 0.6, preferably 0.2 to 0.5 based upon the total moles of monovinyl aromatic monomer, lactam and unsaturated acid monomers incorporated in the graft polymers.

The initial vinyl aromatic-unsaturated acid copolymer backbone has a molar ratio of vinyl aromatic to unsaturated acid in the range of 15:1 to 100:1, preferably 30:1 to 80:1.

The polymers are normally solid and thermoplastic. Generally speaking, the molecular weight range of the polymers are within the range of about 2000 to about 200,000.

The lactams suitable for the practice of the present invention can be characterized as a linear polyamide-forming lactam which has at least 6 atoms in the lactam ring. The lactam monomer preferably has 7 to 13 atoms in the lactam ring. Caprolactam is especially preferred. Other specific utilizable lactams include the following: 2-oxo-pentamethylenimine, 2-oxo-hexamethylenimine (alternatively called caprolactam), 2-oxo-heptamethylenimine, 2-oxo-octamethylenimine, 2-oxo-decamethylenimine.

The monovinyl aromatic compounds which are employed in the practice of this invention include styrene, alpha-methylstyrene, vinylnaphthalene, and derivatives thereof which are free of nuclear substituents which interfere with the production of the desired polymers of this invention.

Specific examples of such monovinyl aromatic compounds include p-methylstyrene, m-methylstyrene, p-ethylstyrene, p-isopropylstyrene, o-chlorostyrene, p-chlorostyrene, ar-dimethylstyrene, ar-dichlorostyrene, ar-methyl-ar-ethylstyrene, ar-methyl-ar-chlorostyrene, beta-vinylnaphthalene, ar-diethylstyrene, p-fluorestyrene, p-bromostyrene, ar-methyl-ar-isopropylstyrene, and the like. The preferred vinyl aromatic compound is styrene.

The unsaturated carboxylic acids suitable for the present invention are: olefinically unsaturated monocarboxylic acids copolymerizable with vinyl aryl compounds and having from 3 to 20 carbon atoms, desirably having 3 to 10 carbon atoms and preferably being the 1-olefiins acrylic or methacrylic acid, said acid monomers being free of groups which substantially interfere with the graft polymer production. In addition to acrylic and methacrylic acids, the various vinyl benzoic acids (9 carbon atoms) such as p-vinyl benzoic acid, are preferred.

The novel polymers of the present invention are preferably prepared by a novel process which ensures uniform distribution of components as well as a substantially gel-free graft polymer product. The present process is characterized by a simultaneous addition of vinyl aromatic and unsaturated acid to a reactor containing lactam as the reaction medium. The addition of the monomers should be regulated to provide the required uniformity of randomness of the respective monomeric units in the copolymer chain. The vinyl aromatic and acid monomers are reacted under mild conditions, e.g. temperatures from 70 to 150° C., preferably 80 to 110° C.

Peroxide catalysts or other known initiators for polymerizing the vinyl aromatic and unsaturated acid to form the backbone polymer can be used. Also, thermal initiation or other suitable initiations can be employed. The polymerization is preferably carried out to substantial completeness, e.g., 99+% polymerization of monomers. Thereafter, any additional required lactam and a suitable catalyst for the graft polymerization such as water, aminocaproic acid or an organic compound which liberates water under reaction conditions (e.g. hexamethylene diammonium adipate) is added and the reaction conditions are adjusted to cause the graft polymerization. If water is employed as the catalyst, ordinarily about 0.2 to 5%, based on the weight of the lactam, is employed.

Generally, temperatures will be increased to 200 to 300° C. preferably 250 to 275° C. to effect lactam polymerization, particularly when the lactam is caprolactam. The amount of graft polymerization catalyst ordinarily is about 0.2 to 5%, based on the weight of lactam. However, the amount of suitable organic compound which liberates water is dependent upon the quantity and rate at which the water is liberated. It is possible also under many reaction conditions to add the lactam catalysts at the beginning of the monovinyl aryl monomer-unsaturated acid copolymer polymerization.

The vinyl aromatic, e.g. styrene, and unsaturated acid, e.g. acrylic acid, should be fed to the polymerization zone containing molten lactam, e.g. caprolactam, at a substantially constant rate.

In order to initiate the reacton and start the formation of free radicals, about 5 to 15, e.g. 10 percent of the monomer charge may be first added and reacted for a period of e.g. 1 to 5 hours, preferably 2 to 3 hours prior to feeding the remainder of the monomer charge at a controlled rate. The monomers may either be mixed in a separate vessel prior to charging or introduced into the polymerized zone as a two-feed stream at controlled rates.

A suitable catalyst normally of the peroxide type, e.g. lauroyl peroxide, acetyl peroxide, benzoyl peroxide, t-butyl hydroperoxide, t-butyl peracetate, caprylyl peroxide, dicumyl peroxide, methyl ethyl ketone peroxide, generally in amounts of 0.25 to 2 wt. percent based on total vinyl aromatic and monomer weight, is present during this initial polymerization conducted under mild conditions not conductive to lactam polymerization. The catalyst alternatively can be a suitable azo catalyst such as azobisisobutyronitrile. The catalyst can be introduced with a mixed stream of monomers, an individual monomer stream, or separately.

After formation of the backbone copolymer, the remainder of the caprolactam and a suitable catalyst therefor, normally water in amounts of 0.2 to 5 wt. percent based on lactam weight is introduced into the reaction vessel and temperatures raised to above 200° C. to effect polymerization, and grafting of the lactam to the backbone copolymer. In general about 0.5 to 50 preferably .8 to 20 moles of lactam per mole of vinyl aromatic is employed in the initial copolymerization step, with the remaining percentage thereof generally being added after the initial polymerization to complete the grafting reaction.

While it is preferred to prepare the unique polymers of the present invention by the novel sequence of process steps heretofore described, other processes, e.g. aqueous suspension or emulsion, can be employed provided that the monovinyl aromatic monomer-unsaturated carboxylic acid copolymers are initially separately prepared so as to have requisite uniform random distribution of the acid functions. Thereafter requisite amounts of the preformed polymer and lactam are dissolved and reacted to carry out the graft polymerization.

The various aspects and modifications of the present invention will be made more clearly apparent from the following description and accompanying examples.

EXAMPLE 1

The following process steps were utilized in forming a graft polymer of caprolactam and styrene-acrylic acid copolymer. The reaction went to 99+% completion to produce a 30 wt. percent styrene graft to polycaprolactam. The resulting polymer after water extraction had the following properties: Relative viscosity 2.64; soluble in m-cresol; essentially gel free; tough, fiber forming.

Procedure for preparing a 30% styrene graft to polycaprolactam.

*Charge*

| | G. |
|---|---|
| Styrene | [1] 180 |
| Acrylic aicd | [1] 1.5 |
| Caprolactam | 420 |
| Tertiary butyl peracetate | 0.91 |
| Water | 12.6 |

[1] 120 : 1 ratio.

*Procedure*

(1) 180 g. of molten caprolactam was added to a resin kettle maintained under nitrogen.

(2) In a separate container styrene, acrylic acid, and the tertiary butyl peracetate were mixed.

(3) Ten percent of the mixed monomer charge was added to the molten caprolactam and heated for 3 hours under nitrogen at 80–85° C. to initiate the reaction.

(4) The remainder of the monomer was fed to the reactor at the rate of approximately 0.5 ml. per minute until all has been added. Heating was continued at 80–85° C. for an additional 8 hours to complete the polymerization.

(5) 240 g. molten caprolactam and 12.6 g. water were then added to the reaction kettle. Reflux conditions were maintained for 2 hours at 205° C. and then 2 hours at 235° C. and then finally 2 hours at 260° C.

(6) Reflux conditions were halted and heating continued for 17 hours at 260° C. maintaining a nitrogen sweep to remove water.

(7) The resin was thereafter removed from the reactor.

EXAMPLE 2

Preparation of a 20% styrene graft to polycaprolactam.

*Charge*

| | G. |
|---|---|
| Styrene | 133.4 |
| Acrylic acid | 2.5 |
| Caprolactam | 533 |
| Tert. butyl peracetate | 0.66 |
| Aminocaproic acid | 22.6 |

*Procedure*

(1) 200 g. molten caprolactam was charged to a resin kettle under nitrogen.

(2) The styrene, acrylic acid, and the tert. butyl peracetate were mixed in a flask. 15 g. of this mixture was added to the resin kettle and heat applied for 3 hours at 90° C.

(3) The remainder of the monomer mixture was added drop-wise and reaction continued overnight at 90° C.

(4) Next were added 333 g. molten caprolactam and then the temperature raised to 205° C. before adding the aminocaproic acid.

(5) Reflux was conducted for 2 hours at 205° C., 2 hours at 230° C., and 2 hours at 260° C.

(6) Reflux conditions were halted and heating continued for 17 hours at 260° C.

EXAMPLE 3

The following is a description of the procedure employed to form a 40% styrene graft polymer:

*Charge*

| | G. |
|---|---|
| Styrene | 3120 |
| Acrylic acid | 41.6 |
| Caprolactam | 4680 |
| Tertiary butyl peracetate | 23.7 |

Water, 94 ml.

*Procedure*

(1) 3120 g. molten caprolactam is added to kettle under nitrogen at 90° C.

(2) 1040 g. styrene, 138 g. acrylic acid, and 7.9 g. tertiary butyl peracetate were mixed in a flask.

(3) 315 g. of monomer mixture were added to the molten caprolactam and heated at 90° C. for 3 hours.

(4) The remainder of the monomer mixture was added drop-wise (250 ml./hr.)

(5) A second batch of monomer as in step #2 was prepared and drop-wise addition was continued.

(6) A third batch of monomer as in step #2 was prepared and the drop-wise addition finished. After all of the monomer was added heating was continued overnight.

(7) Next 1560 g. additional molten caprolactam plus 94 ml. water was charged.

(8) Kettle was sealed and heated at 230° C. for 3 hours under pressure. (If pressure went above 30 p.s.i.g., vent valve was cracked to reduce pressure.)

(9) At the end of 3 hours steam was bled off slowly to atmospheric pressure and nitrogen sweep started for 15 hours at 250° C.

The solid polymer produced by the above process after water extraction had the following properties:

Relative viscosity 2.39; soluble in m-cresol, fiber forming, forms tough molded parts.

EXAMPLE 4

Test samples of the 20 and 30% styrene-polycaprolactam polymers made in accordance with Examples 1 and 2 were tested for water absorption and compared with polycaprolactam and nylon 66. Dogbone and bar shaped samples were boiled in 55 wt. percent potassium acetate solution for 25 hours. The polymers were then tested for water absorption by weight pickup. As shown below, the present polymers showed improved water absorption characteristics.

TABLE I

| Sample | Dog Bone Shape | Bar Shape |
| --- | --- | --- |
| (1) Commercial polycaprolactam | 2.81 | 2.68 |
| (2) Commercial nylon 66 | 2.31 | 2.48 |
| (3) 20% styrene-caprolactam polymer (Example 2) | 2.03 | 2.48 |
| (4) 30% styrene-caprolactam polymer (Example 1) | 1.86 | 1.81 |

EXAMPLE 5

The following data further illustrates the improved moisture resistance of the present polymers. This data was obtained by immersion in water rather than by exposure to acetate solution. The temperature of the water was 70° F. The percentage of water absorbed at the end of one and ten weeks are listed in the following table:

TABLE 2

| | Moisture Percent Absorption | |
| --- | --- | --- |
| | 1 week | 10 weeks |
| (1) Commercial nylon 6 | 4.30 | 9.95 |
| (2) Commercial nylon 6-6 | 3.00 | 8.15 |
| (3) 20% styrene copolymer (Example 2) | 3.00 | 7.55 |
| (4) 30% styrene copolymer (Example 1) | 2.25 | 5.95 |
| (5) 40% styrene copolymer (Example 3) | 1.70 | 4.95 |

EXAMPLE 6

The following is a description of a graft co-polymer formed by employing methacrylic instead of acrylic acid:

Methacrylic acid

|  | G. |
| --- | --- |
| Styrene | 2000 |
| Methacrylic acid | 23.9 |
| Caprolactam | 6000 |
| Teritary butyl peracetate | 15.0 |

Water, 120 ml.

Procedure (1) 2000 g. molten caprolactam was added to kettle at 90° C. and under a nitrogen atmosphere.

(2) 667 g. styrene, 8.0 g. methacrylic acid, and 5.0 g. of teritary butyl peracetate were mixed in a flask.

(3) 200 g. of the monomer mixture was added to the molten caprolactam and heated at 90° C. for 3 hours.

(4) The remainder of the monomer mixture was added drop-wise (250 ml./hr.). A second batch of monomer as in step #2 was prepared in the mean-time and added drop-wise.

(5) A third batch was prepared as in Step #2 and the drop-wise addition completed.

(6) After all the monomer was added heating was continued overnight.

(7) Next 4000 g. additional molten caprolactam plus 120 g. water was charged.

(8) Kettle was sealed and heated at 230° C. for 3 hours under pressure. (If the pressure went above 30 p.s.i.g. valve was cracked to reduce pressure.)

(9) At the end of 3 hours the steam was bled off slowly to atmospheric pressure and then the nitrogen sweep started for 15 hours at 250° C.

The resultant polymer had the following properties: Relative viscosity 3.16; soluble in m-cresol, fiber forming, forms tough molded parts.

EXAMPLE 7

The following example illustrates the use of p-vinyl benzoic acid instead of acrylic acid in the graft copolymer.

Charge

|  | G. |
| --- | --- |
| Styrene | 180 |
| p-Vinyl benzoic acid | 3.7 |
| Caprolactam | 420 |
| Teriary butyl peracetate | 0.91 |
| Water | 12.6 |

Procedure (1) 180 g. of molten caprolactam is added to a resin kettle maintained under nitrogen.

(2) In a separate container, p-vinyl benzoic acid, styrene and the tertiary butyl peracetate is mixed.

(3) 10% of the mixed monomer charge is added to the molten caprolactam and heated for 3 hours under nitrogen at 80–85° C. to initiate reaction.

(4) The remainder of the monomer is fed to the reactor at the rate of approximately 0.5 ml. per minute until all is added. Heating is continued at 80–85° C. for an additional 8 hours to complete the polymerization.

(5) 240 mg. molten caprolactam and 12.6 g. water is then added to the reaction kettle. Reflux conditions are maintained for 2 hours at 205° C. and then 2 hours at 235° C. and then finally 2 hours at 260° C.

(6) Reflux conditions are halted and heating continues for 17 hours at 260° C. maintaining a nitrogen sweep to remove water.

(7) The resin is thereafter removed from the reactor.

EXAMPLE 8

The following procedure was employed to form a 20% styrene graft copolymer of styrene, acrylic acid and 2-oxo-heptamethylenimine.

Charge

|  | G. |
| --- | --- |
| Styrene | 22.4 |
| Acrylic acid | 0.22 |
| 2-oxo-heptamethylenimine (caprylactam) | 111.8 |
| Tertiary butyl peracetate | 0.22 |
| Amonicaproic acid | 4.45 |

Procedure (1) 22.4 g. molten caprylactam was added to a 250 ml. 3-neck flask under nitrogen.

(2) Styrene, acrylic acid, tertiary butyl peracetate were mixed in a flask.

(3) 3 g. of the monomer mixture was added to the molten caprylactam and heated at 90° C. for three hours.

(4) The remainder of the monomer mixture was added drop-wise over a 6–8 hour period at 90° C. Reaction was continued overnight.

(5) 89.4 g. molten caprylactam was added next and heated to 220° C. before adding the aminocaproic acid.

(6) Reflux conditions were maintained for 2 hours at 220° C., 2 hours at 230° C. and 2 hours at 260° C.

(7) Reflux conditions were halted and heating continued for 15–17 hours.

The resultant solid polymer was water extracted and dried to provide a tough, fiber-forming polymer, which is soluble in m-cresol.

In another example, of compositions of the present invention, the above procedure is repeated employing an equimolar amount of 2-oxo-decamethylenimine in place of the 2-oxo-heptamethylenimine and a reaction temperature of 240° C. to 280° C.

EXAMPLE 9

The following illustrates that the prior art procedures do not give the polymers of the present invention.

The procedure employed was that of Example 7 of Flory Patent No. 2,524,045.

A. Preparation of the copolymer of styrene-acrylic acid [1] (7.75 wt. percent styrene in polymer).

Charge

|  | G. | Mole |
|---|---|---|
| Styrene | 34.7 (89.66%) | 0.334 |
| Acrylic acid | 4.0 (10.34%) | 0.055 |
| Benzoyl Peroxide | 0.19 | |

Procedure (1) In a test tube containing a ground glass joint, the styrene, acrylic acid, and benzoyl peroxide were added and mixed to complete solution.

(2) The reaction mixture was placed in a furnace and connected to a reflux condenser containing a nitrogen sweep.

(3) The mixture was heated to 80° C. to complete the polymerization.

(4) The tube was cooled and resin core removed. The core was ground into small chips.

B. Grafting the copolymer to caprolactam.

Charge

|  | G. | Mole |
|---|---|---|
| Copolymer | 30.7 | {.051, 0.309} |
| Caprolactam | 500 | 4.425 |
| Water | 16 | |
| p-Hydroxydiphenyl | 102.6 | |

Procedure (1) The molten caprolactam was charged to a resin kettle under nitrogen.

(2) The caprolactam was heated to 176° C. and the copolymer and p-hydroxydiphenyl added while agitating.

(3) Next water was added and reaction temperature raised to 205° C. Conditions were held at this temperature under reflux for 2 hours, then 2 hours at 235° C., and finally 2 hours at 260° C.

(4) Reflux conditions were removed and heat applied for an additional 15 hours at 260° C.

Results

The resin contained gel and was difficult to remove from the reactor.

The product was highly gelled; was insoluble in m-cresol, and could not be removed by the discharge orifice of the reactor by conventional use of pressure. It thus was quite distinct from the substantially non-crosslinked gel-free graft polymers of the present invention.

Various modifications can be made to the present invention.

Having described the present invention that which is sought to be protected is set forth in the following claims.

What is claimed is:

1. A process for forming improved graft polymers of a lactam, monovinyl aromatics and unsaturated acids which comprises: feeding simultaneously both a monovinyl aromatic and unsaturated acid to a polymerization zone containing a lactam as a reaction medium, maintaining temperatures of under 200° C. in said polymerization zone so as to polymerize said monovinyl aromatic and unsaturated acid and form a resultant copolymer thereof without significant lactam polymerization, and then increasing the temperature so as to cause said lactam to polymerize and graft to the monovinyl aromatic-unsaturated acid copolymer previously formed.

2. The process of claim 1, wherein the molar ratio of vinyl aromatic compound to unsaturated acid fed to said polymerization zone is in the range of 15:1 to 100:1, and sufficient lactam is introduced into the polymerization zone so that the final graft polymer contains 0.15 to 0.6 moles of styrene based on total moles of monomers in said graft polymer.

3. The process of claim 1, wherein said lactam is caprolactam, and a peroxide catalyst is present in minor amounts in the polymerization zone maintained temperature of 70 to 150° C. so as to form said copolymer by reaction of substantially all of said monovinyl aromatic, and thereafter additional caprolactam and a catalyst selected from the group consisting of water, organic catalysts which liberate water under reaction conditions, and aminocaproic acid added to said polymerization zone and its temperature raised to 200 to 300° C. to effect caprolactam polymerization and grafting thereof to said initially formed copolymer.

4. An improved process for forming caprolactam graft polymers which comprises:
introducing styrene and an unsaturated carboxylic acid selected from the group consisting of acrylic acid, methacrylic acid and p-vinyl benzoic acid and a peroxide catalyst into a reaction zone, said reaction zone further containing molten caprolactam as a reaction medium, the molar ratio of total styrene to unsaturated carboxylic acid introduced being in the range of 15:1 to 100:1, the bulk of said styrene and acid being introduced simultaneously at a substantially constant controlled rate;
maintaining relatively mild temperatures of 70 to 150° C. in said reaction zone so as to substantilly completely polymerize said styrene and unsaturated acid to form a copolymer thereof without significant caprolactam polymerization;
adding an additional amount of caprolactam and water as a catalyst and elevating the temperature of said reaction zone to 200 to 300° C. to effect caprolactam polymerization and grafting to said styrenene-unsaturated acid copolymer, sufficient styrene and caprolactam being reacted so as to form a graft polymer containing 0.15 to 0.6 moles styrene based on total moles of monomer in the graft polymer.

5. The process of claim 4, wherein a minor amount of said styrene and unsaturated carboxylic acid are first added to the reaction zone containing molten caprolactam so as to initiate free radical formation, and thereafter the remainder of the styrene and unsaturated carboxylic acid introduced simultaneously in a controlled constant continuous manner.

6. The process of claim 4, wherein said styrene and unsaturated carboxylic acid are introduced as a premixed stream.

7. The process of claim 4, wherein said unsaturated carboxylic acid is acrylic acid.

8. The process of claim 4, wherein said peroxide catalyst is tertiary butyl peracetate.

9. The process of claim 1, wherein said monovinyl aromatic and unsaturated acid is copolymerized in the presence of tertiary butyl peracetate as a catalyst.

10. An improved process for forming caprolactam graft polymers which comprises:
introducing a monovinyl aromatic and an unsaturated carboxylic acid into reaction zone in the presence of a catalytic amount of a catalyst for polymerizing said vinyl aromatic and unsaturated acid, said reaction zone further contaning molten lactam as a reaction medium, the molar ratio of monovinyl aromatic to unsaturated carboxylic acid introduced being in the range of 15:1 to 100:1, the bulk of said monovinyl

---

[1] Styrene: acrylic acid ratio is 6.07:1. Styrene: total monomer (styrene, acrylic acid, caprolactam) ratio is 0.65:1.

aromatic and acid being introduced simultaneously at a substantially constant rate;

maintaining a temperature of 70 to 150° C. in said reaction zone so as to substantially completely polymerize said monovinyl aromatic and unsaturated acid to form a copolymer thereof without significant lactam polymerization;

adding an additional amount of lactam and a catalyst selected from the group consisting of water, organic catalysts which liberate water under reaction conditions, and aminocaproic acid, and elevating the temperature of said reaction zone to 200° to 300° C. to effect lactam polymerization and grafting to said monovinyl aromatic-unsaturated acid copolymer, sufficient monovinyl aromatic and lactam being reacted so as to form a graft polymer containing 0.15 to 0.6 moles of monovinyl aromatic based on total moles of monomer in the graft polymer.

11. The process of claim 10 wherein said lactam is caprolactam, said monovinyl aromatic is styrene, and said unsaturated carboxylic acid is selected from the group consisting of acrylic acid, methacrylic acid and p-vinyl benzoic acid.

12. The process of claim 10 wherein the catalyst for the initial polymerization reaction is a peroxide catalyst.

References Cited
UNITED STATES PATENTS 2,524,045    6/1946    Flory _____ 260—857
3,136,738    6/1964    Hedrick et al. _____ 260—857

MURRAY TILLMAN, Primary Examiner.

J. T. GOOLKASIAN, Assistant Examiner.